(12) United States Patent
Nakamura et al.

(10) Patent No.: US 6,290,031 B1
(45) Date of Patent: Sep. 18, 2001

(54) ROTARY BRAKE PART

(75) Inventors: Koji Nakamura; Katsuhiro Shibata; Katsuhiro Kitamura, all of Wako (JP)

(73) Assignee: Honda Giken Kogyo Kabushiki Kaisha, Tokyo (JP)

(*) Notice: Subject to any disclaimer, the term of this patent is extended or adjusted under 35 U.S.C. 154(b) by 0 days.

(21) Appl. No.: 09/500,812

(22) Filed: Feb. 10, 2000

(30) Foreign Application Priority Data

Feb. 12, 1999 (JP) .................................. 11-034664

(51) Int. Cl.[7] ............................ F16D 69/02; F16D 65/10
(52) U.S. Cl. ................................ 188/218 R; 188/251 R
(58) Field of Search .................... 188/251 R, 251 M, 188/251 A, 250 A, 218 R, 264 R, 78, 79, 74

(56) References Cited

U.S. PATENT DOCUMENTS

| | | | |
|---|---|---|---|
| 1,010,787 | * 12/1911 | Nilson . | |
| 2,070,847 | * 5/1937 | Sargent | 188/218 |
| 2,160,598 | * 5/1939 | Melrath | 29/148.2 |
| 2,806,559 | * 9/1957 | Kerr | 188/218 |
| 2,840,195 | * 6/1958 | Holton | 188/218 |
| 2,844,229 | * 7/1958 | Whitfield | 188/218 |
| 3,176,804 | * 4/1965 | Erickson | 188/250 |
| 4,806,333 | * 2/1989 | Egerton et al. | 423/625 |
| 5,198,007 | * 3/1993 | Moyer et al. | 55/523 |
| 5,360,329 | * 11/1994 | Lemelson | 425/143 |
| 5,660,877 | * 8/1997 | Venkataramani et al. | 427/100 |
| 5,878,849 | * 3/1999 | Prunier, Jr. et al. | 188/251.4 |

* cited by examiner

*Primary Examiner*—Douglas C. Butler
*Assistant Examiner*—Melody M. Burch
(74) *Attorney, Agent, or Firm*—Arent Fox Kintner Plotkin & Kahn

(57) ABSTRACT

To inhibit the excessive wearing of a friction contact surface forming portion of a brake drum and a friction member by the abrading action of a worn powder and the like, and to reinforce the friction contact surface forming portion, in a drum body of a brake drum, an annular friction contact surface forming section includes a plurality of composite portions disposed in a circumferential direction thereof, each comprising a metal matrix and a large number of dispersions, and a plurality of metal portions formed only of a metal. Thus, it is possible to force a worn powder and the like into each of the metal portions of the friction contact surface forming section by the urging force of the friction member during a braking operation to retain the worn powder and the like.

3 Claims, 2 Drawing Sheets

ROTARY BRAKE PART

BACKGROUND OF THE INVENTION

1. Field of the Invention

The present invention relates to a rotary brake part for a vehicle, and more particularly, to a rotary brake part which is rotated with the wheels of the vehicle and is brought into friction contact with a friction member during a braking operation of the vehicle. This type of the rotary brake part corresponds to a brake drum and a brake disk.

2. Description of the Prior Art

There is a conventionally known brake drum which is formed of an aluminum alloy composite material having excellent wear and heat resistances due to the demand for a reduction in weight of the brake drum.

However, when the brake drum formed of the aluminum alloy composite material is combined with a conventional friction member made of a cast iron for the drum, the problem arises in that the friction coefficient is reduced and for this reason, the brake effectiveness is reduced.

Therefore, it is a conventional practice to replace the friction member by a member having a strong attacking property to the friction contact surface forming section of the brake drum by inclusion of a large amount of an abrasive material or the like. However, if such a measure is employed, since the brake drum has a structure in which a worn powder containing the abrasive material and falling dispersions (e.g., SiC grains) are difficult to discharge out from the drum, there arises a new problem in that the worn powder and the like are liable to stay in the drum, and the wearing of the friction contact surface forming section of the brake drum and the friction member becomes excessive due to the abrading action of the worn powder and the like.

The abrading action of the worn powder and the like is varied in level, but causes a problem even in a brake disk having a good worn powder-discharging characteristic.

SUMMARY OF THE INVENTION

It is an object of the present invention to provide a rotary brake part, wherein the excessive wearing of the friction contact surface forming section and the friction member due to the abrading action of the worn powder and the like can be inhibited, and the friction contact surface forming section can be reinforced.

To achieve the above object, according to the present invention, there is provided a rotary brake part which is rotated with a wheel of the vehicle and brought into friction contact with a friction member during a braking operation of the vehicle. The rotary brake part comprises an annular friction contact surface forming section which is comprised of at least one composite portion disposed in a circumferential direction of the friction contact surface forming section and comprising a metal matrix and a large number of dispersions in the metal matrix. At least one metal portion is formed only of a metal.

If the rotary brake part is constructed as described above, it is possible to ensure wear and heat resistances of the friction contact surface forming section and to force worn powder and falling dispersions into the metal portion of the friction contact surface forming section by the urging force of the friction member during a braking operation and to thus retain them in the metal portion. Thus, it is possible to inhibit the excessive wearing in the friction contact surface forming section and the friction member due to the abrading action of the worn powder and the like and to reinforce the metal portion in a composite manner by the forced-in worn powder and the like.

DETAILED DESCRIPTION OF THE PREFERRED EMBODIMENT

Figure 1:
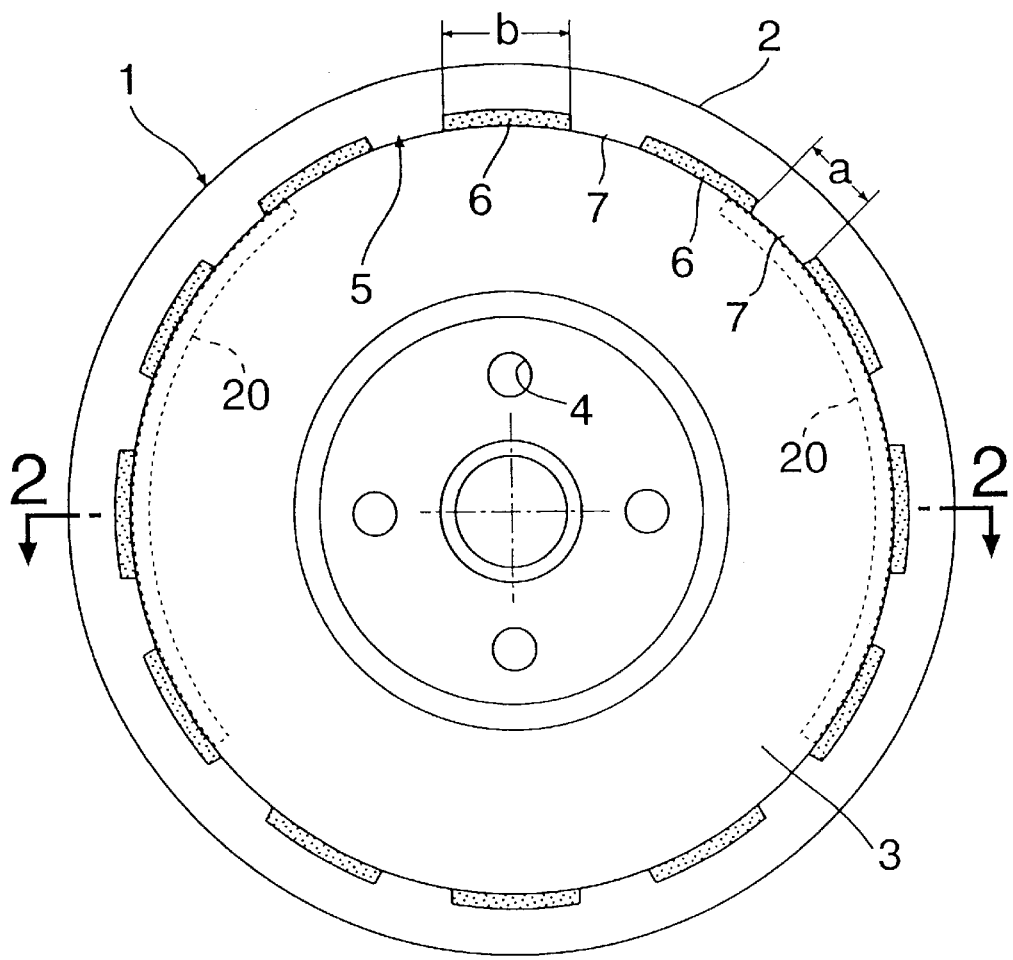
FIG. 1 is a side view of one embodiment of a brake drum of the present invention.
Figure 2:
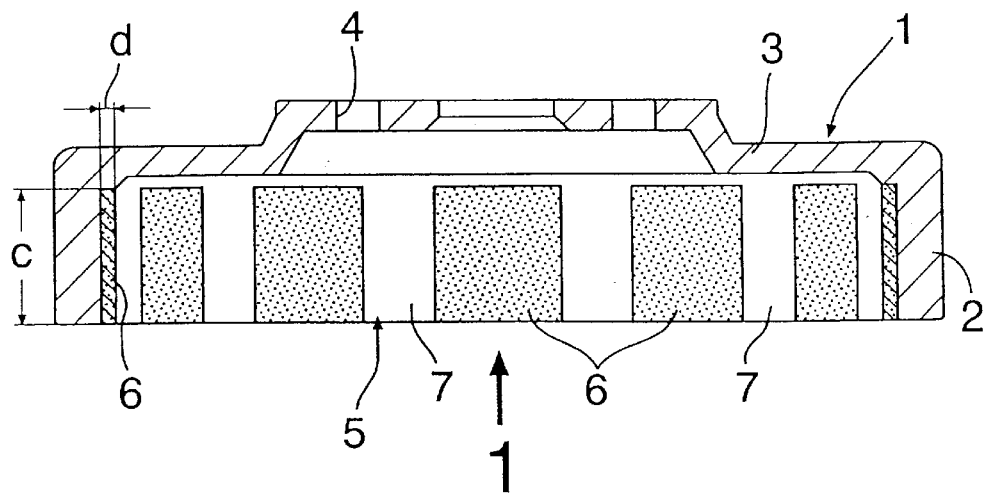
FIG. 2 is a sectional view taken along a line 2—2 in FIG. 1.

Referred to FIGS. 1 and 2, a brake drum 1 as a rotary brake part comprises a drum body 2 having a cylindrical shape, and an annular attachment section 3 connected to one of the ends of the drum body 2. An inner peripheral surface of the drum body 2 is in friction contact with a friction member 20 and thus with the lining of a brake shoe during a braking operation. The attachment section 3 is mounted to a wheel hub and has four bolt insertion bores 4.

In the drum body 2, an annular friction contact surface forming section 5 located around the inner periphery of the drum body 2 is comprised of at least one, e.g., a plurality (in the embodiment) of composite portions 6 of a thin plate shape, which are positioned in the circumferential direction of the friction contact surface forming section 5. Each composite portion 6 comprises a metal matrix and a large number of dispersions. The contact surface section 5 includes at least one, e.g., a plurality (in the embodiment) of metal portions 7 which is formed only of a metal. In this case, the composite portions 6 and the metal portions 7 are disposed alternately. Each of the metal portions 7 is made of the same material as the metal forming most of the brake drum 1 excluding the friction contact surface forming section 5 and as the metal matrix of each of the composite portions 6.

The brake drum 1 is made by casting. A plurality of thin plates each corresponding to the composite portion 6 are positioned in a cavity in a casting mold, and a molten metal is poured into the cavity to cast-in each of the thin plates. If the metal matrix of the composite portion 6 is made from the same material as the metal forming most of the brake drum 1 including the metal portion 7, the deposition of each of the composite portions 6 by the casting-in is enhanced. However, if the deposition enhancing effect is obtained, the metal matrix and the metal forming most of the brake drum 1 may also be different materials.

The thin plate corresponding to the composite portion 6 is produced by a process which comprises the steps of producing a billet comprising a metal matrix and a large number of dispersions using a permeating process, a grain dispersing process or the like. Then using the billet, a thin plate-shaped extruded material having a radius of curvature matched with an inner diameter of the drum body 2 is produced which has substantially the same peripheral width b as that of the composite portion 6. The extruded material is cut to provide a thin plate having substantially the same length c in the direction of a rotational axis as the composite portion 6.

The metal matrix is formed of an aluminum alloy, a magnesium alloy or the like, and the dispersion is formed of SiC grains, $Al_2O_3$ grains, AlN grains, $SiO_2$ grains or the like.

If the brake drum 1 is constructed in the above manner, it is possible to ensure a wear resistance and a heat resistance for the friction contact surface forming section 5 and to force worn powder and falling dispersion into each of the metal portions 7 of the friction contact surface forming section 5 by the urging forces of the brake shoe and the lining during a braking operation to retain them in each of the metal portions 7. Thus, it is possible to inhibit the excessive wearing of the friction contact surface forming section 5 and the lining due to the abrading action of the worn powder and the like, and to reinforce each of the metal portions 7 in a composite manner by the worn powder forced into each of the metal portions 7.

It is desirable to occupy 50% or more of the inner peripheral length of the drum body 2 with the composite portions 6 for the purpose of ensuring the wear resistance and the like of the drum body 2. To reliably embed the worn powder and the like into the metal portion 7, it is desirable that the distance between the adjacent composite portions 6, namely, the peripheral width a of the metal portion 7, is equal to or larger than 2 mm.

A particular example will be described below.

A brake drum 1 was prepared which includes a plurality of composite sections 6 each comprising an aluminum alloy (A6061) matrix and SiC grains having a volume fraction Vf equal to 20% and most of which excluding the composite portions 6 is made of the same aluminum alloy (A6061) as that described above. In this case, the inner peripheral length of the drum body 2 was set at 565.2 mm; the peripheral width b of each of the composite portions 6 was set 44.6 mm; the length c in the direction of the rotational axis was set at 30 mm; the radial width d was set at 3 mm; and the peripheral width a of each of the metal portions 7 was set at 2.5 mm. This brake drum 1 is the first example according to the present invention.

For comparison, a brake drum was prepared which includes a friction contact surface forming section 5 having the same entire structure as the composite portion 6. This is a comparative example.

The brake drum of the first example and the comparative example were subjected to automobile brake device dynamometer test (JASOC406-82) to measure worn amounts of the friction contact surface forming section 5 and a lining formed of an aramid fiber-reinforced phenolic resin, thereby providing results shown in Table 1.

TABLE 1

| | Worn amount ($\mu$m) | |
| --- | --- | --- |
| | Friction contact surface forming section | Lining |
| First Example | 2 | 150 |
| Comparative Example | 5 | 300 |

It can be seen from Table 1 that the amount of friction contact surface forming section 5 worn in the first example is 40% of that in the comparative example, and the amount of lining worn in the first example is 50% of that in the comparative example.

The amount of friction contact surface forming section 5 worn in the first example is an average value calculated from the amounts of composite portions 6 worn and the amounts of metal portions 7 worn. In this case, there is little difference between the amount of composite portions 6 worn and the amount of metal portions 7 worn. It is of course that each of the amounts of friction contact surface forming section worn in the comparative example and lining worn in both the examples is an average value calculated from the worn amounts measured at a plurality of measurement points.

Figure 3:
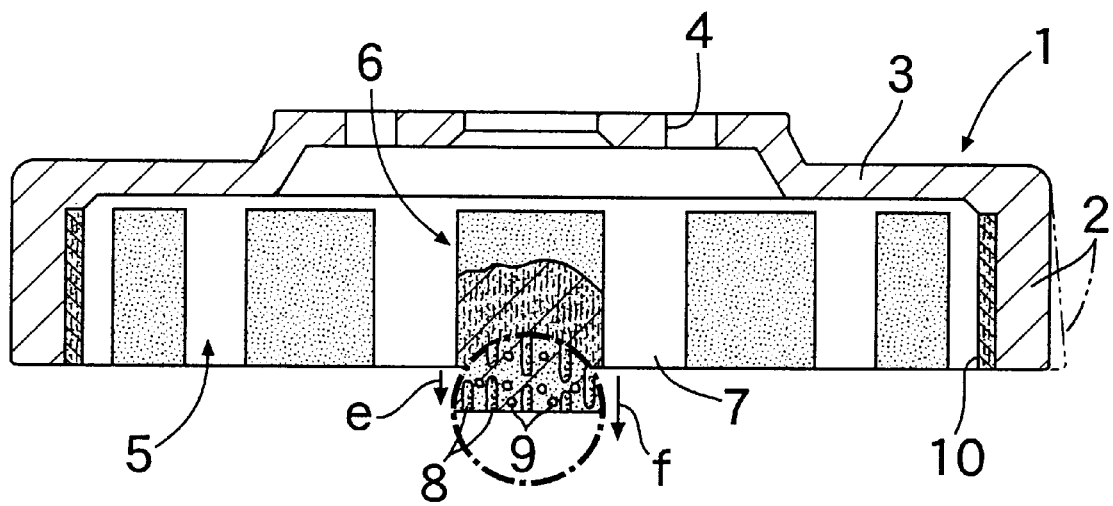
FIG. 3 is a sectional view of another embodiment of a brake drum, similar to FIG. 2.

In the brake drum 1 shown in FIG. 3, a dispersion in each of composite portions 6 comprises ceramic grain aggregates 8 which are fine and have an aspect ratio A larger than 1, and fine ceramic grains 9. In this case, the large number of ceramic grain aggregates 8 are oriented with their lengthwise direction e matched with a direction f of a rotational axis.

If the brake drum 1 is constructed in this manner, the drum body 2 is reinforced by the orientation of the large number of ceramic grain aggregates 8 in such a manner that a large number of metal reinforcements are embedded in the direction f of the rotational axis. In addition, the drum body 2 is reinforced over its entire region in a grain-dispersed manner by the large number of fine ceramic grains 9. Therefore, it is possible to inhibit the spreading of an opening 10 in the drum body 2 as shown by a dashed line due to a friction heat to a large extent.

The ceramic grain aggregates 8 correspond to alumina agglomerates having an average diameter of 20 to 100 $\mu$m, alumina granulates and the like. The alumina agglomerates are necessarily produced in the course of production of aluminum from bauxite, and are relatively spherical agglomerates comprising a large number of fine alumina grains and are inexpensive as compared with reinforcing grains such as alumina grains, silicon carbide grains and the like, and a reinforcing fiber such as a alumina fiber, a silica fiber and the like. The alumina granulates are formed into a granular shape by granulating a large number of fine alumina grains with a binder such as a resin.

Figure 4:
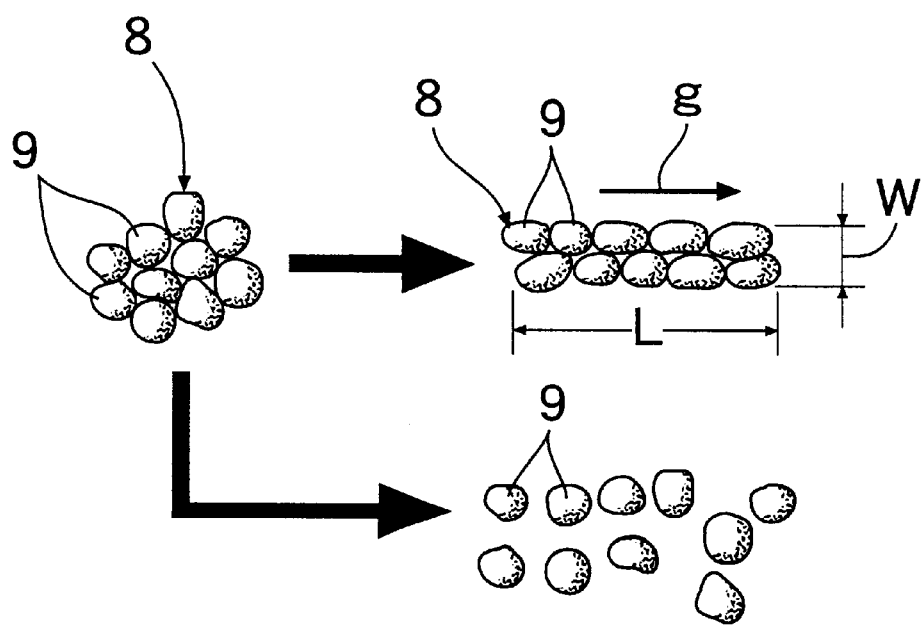
FIG. 4 is a diagram for explaining the change of the form of a ceramic grain aggregate by an extrusion.

As shown in FIG. 4, the alumina agglomerates 8 or the like are substantially spherical at the beginning, but have an aspect ratio A equal to L/W>1 as a result of stretching of the alumina agglomerates in an extruding direction g in an extruding step of producing an extruded material which is the material for the composite portions 6. In this case, it is desirable that the aspect ratio A is equal to or larger than 2 (A$\geq$2) in order to reliably inhibit the opening of the drum body 2. The fine ceramic grains 9 are those produced by disintegration of the ceramic grain aggregates 8 in the extruding The present invention is also applicable to a brake disk.

As discussed above, according to the present invention, it is possible to provide a rotary brake part such as a brake drum, wherein the excessive advance of the wearing of the friction contact surface forming section and the friction member by the abrading action of the worn powder can be inhibited, and the friction contact surface forming section can be reinforced by constructing the rotary brake part in the above-described manner.

Further, it is possible to inhibit the spreading of the opening in the drum body due to the friction heat to a large extent by constructing the rotary brake part in the above-described manner.

The present invention may be embodied in other specific forms without departing from the spirit or essential characteristics thereof. The presently disclosed embodiments are therefore to be considered in all respects as illustrative and not restrictive, the scope of the invention being indicated by the appended claims, rather than the foregoing description, and all changes which come within the meaning and range of equivalency of the claims are, therefore, to be embraced therein.

What is claimed is:

1. A rotary brake part for a vehicle which is rotated with a wheel of the vehicle and brought into friction contact with a friction member during a braking operation of the vehicle, comprising an annular friction contact surface forming section including at least one metal portion consisting essentially of metal and at least one composite portion disposed in a circumferential direction of the friction contact surface forming section and comprising a metal matrix having a plurality of dispersions therein, wherein said dispersions comprise ceramic grain aggregates having an aspect ratio A larger than 1, said ceramic grain aggregates being oriented with the lengthwise directions thereof aligned with the direction of the rotational axis of said rotary brake part.

2. A rotary brake part according to claim 1, wherein said rotary brake part is a brake drum having a drum body including said friction contact surface forming section.

3. A rotary brake part according to claim 1, wherein the dispersions are at least one of SiC grains, $Al_2O_3$ grains, AlN grains and $SiO_2$.

* * * * *